United States Patent
Lin et al.

(10) Patent No.: US 12,531,651 B2
(45) Date of Patent: Jan. 20, 2026

(54) PREAMBLE PUNCTURING BANDWIDTH ALLOCATION

(71) Applicant: Hewlett-Packard Development Company, L.P., Spring, TX (US)

(72) Inventors: I-Chen Lin, Taipei (TW); Yao Cheng Yang, Taipei (TW); Yung-Chang Wei, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 328 days.

(21) Appl. No.: 18/467,319

(22) Filed: Sep. 14, 2023

(65) Prior Publication Data
US 2025/0096925 A1   Mar. 20, 2025

(51) Int. Cl.
*H04L 1/00* (2006.01)

(52) U.S. Cl.
CPC .......... *H04L 1/0026* (2013.01); *H04L 1/0068* (2013.01)

(58) Field of Classification Search
CPC ...... H04L 1/0026; H04L 1/0068; H04L 5/003
See application file for complete search history.

(56) References Cited

U.S. PATENT DOCUMENTS

| | | |
|---|---|---|
| 10,541,778 B1 | 1/2020 | Cizdziel et al. |
| 2019/0182842 A1* | 6/2019 | Hu ............... H04L 27/2626 |
| 2022/0029735 A1* | 1/2022 | Chen ............... H04L 5/0066 |
| 2022/0085910 A1 | 3/2022 | Sun et al. |
| 2023/0040899 A1 | 2/2023 | Seok et al. |
| 2023/0094028 A1 | 3/2023 | Laurent |

FOREIGN PATENT DOCUMENTS

| | | |
|---|---|---|
| EP | 3706358 A1 | 9/2020 |
| WO | 2020/221727 A1 | 11/2020 |

\* cited by examiner

*Primary Examiner* — Steven Hieu D Nguyen
(74) *Attorney, Agent, or Firm* — Quarles & Brady LLP (57) ABSTRACT

An example wireless networking device (e.g., Access point) dynamically managing preamble puncturing for OFDM-based communications. The wireless networking device determines first criteria of a signal quality and further determines to allow preamble puncturing, wherein the signal quality of the determines the occupancy of a subchannel. Based on the determination to preamble puncture, apply dynamically, preamble puncturing to an adjacent subchannel. The wireless networking device further monitors the subchannel signal quality and determines based on a second criteria, an amount of bandwidth useable from an adjacent bandwidth. The wireless networking device, based on the second criteria, dynamically allocate bandwidth from the adjacent subchannel.

20 Claims, 8 Drawing Sheets

PREAMBLE PUNCTURING BANDWIDTH ALLOCATION

BACKGROUND

Wireless local area networks (WLANs) generally refer to wireless-based computing networks that interconnect two or more devices. WLANs typically include one or more wireless access points (AP), sometimes referred to as a host device, that connect to several computing devices using radio frequency-based communications. In a WLAN, the APs are designed to exchange wireless signals with other devices (e.g., local devices) that have joined the WLAN. The APs further facilitate access to other communication networks, such as the Internet or the like.

Generally described, an AP creates a wireless connection between multiple local devices within a specified area. Such wireless connections have been standardized in terms of defining the radio frequencies and communication protocols used to establish individual communication channels between APs and local devices. For example, one WLAN standard is promulgated by the Institute of Electrical and Electronic Engineers (IEEE) 802.11x family of standards, typically referred to as the Wi-Fi Standard(s). Different versions/revisions of the Wi-Fi standards define specific bands (e.g., frequency ranges) of communications for radio transmissions between the APs and local devices.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

To facilitate transmissions between a greater number of local devices and APs, some implementations of Wi-Fi standards utilize methodologies to allocate communication channels within a defined frequency band. One example is the incorporation of orthogonal frequency division multiplexing (OFDM)-based communications as part of the Wi-Fi standards to allow for the sub-division of communications into a plurality of fixed size subchannels (e.g., a plurality of equal bandwidth subchannels within a frequency band). Generally described, individual local devices may establish communications with an AP and be assigned one or more subchannels within the frequency band that will be utilized to exchange information. However, as the density of a WLAN increases (e.g., the number of local devices connected to an AP) or the data transmission requirements for local devices increases, some portion of the local devices may require greater communication bandwidth than is available in individual subchannels assigned by the AP.

Certain examples described herein provide a system for applying preamble puncturing in radio frequency communications. Specifically, one or more aspects of the present application correspond to the management of the allocation of portions of previously assigned subchannels utilizing preamble puncturing, wherein the OFDM communications include a preamble field in front of a signal field and data fields in the basic frame structure. Illustratively, an AP may allocate a set of subchannels in accordance with OFDM-based communications as promulgated illustratively in the IEEE 802.11ax (Wi-Fi 6) and 802.11be (Wi-Fi 7) wireless network standards. For individual local devices assigned spectral subchannel (generally "subchannel"), if the desired bandwidth exceeds the bandwidth available in the assigned subchannel and an adjacent subchannel has been previously allocated, the AP will make a first determination whether to allow for a reallocation of bandwidth from an adjacent subchannel based on a first determination that the energy of air interference is less than a specified threshold. Such reallocation is illustratively facilitated through preamble puncturing. Additionally, the AP can dynamically determine the amount of bandwidth reallocated from the adjacent subchannel based on the subchannel bit error rate (BER) and signal-to-noise-ratio (SNR) and exceeding a second threshold. The dynamic determination of the bandwidth may increase or decrease the allocation of the subchannel based on a determined requirement as an incumbent device may be occupying a portion of a subchannel. The incumbent device may be occupying a variety of bandwidth sizes of the subchannel and may comprise different spectral locations in different instances. Thus, dynamic allocation and/or reallocation and important for improving efficiency.

The system as described generally comprises an electronic device that may be a node in a local network. The local network, as an example, can be a network in a home setting, office setting, work setting, and a public useable network that are confined to a location. The network node, for example, can be a router or an access point, or any type of host device, and is able to provide network to multiple electronic devices/client devices within the local area. The electronic device is operable in the wireless network standard.

The electronic device may be comprised of a transceiver, a processor, and a memory storage device configured to store processor instruction. The processor is instructed to scan the local area for a radio frequency (RF) channel that is compatible with a client device requirement to establish a connection to the client device. By way of exemplary interaction, the client device may be operable in wireless network standards, such as the IEEE 802.11ax (Wi-Fi 6) and/or 802.11be (Wi-Fi 7), or other similar wireless network standards, including successor standards. Further, based on the determination of the RF channel and client requirements the electronic device establishes a connection with the client device.

In another aspect, the electronic device may be comprised of a transceiver, a processor, and a memory storage device configured to store processor instructions. The processor is instructed to scan the local area for an RF channel that is compatible with a multiple-client device. The electronic device is configured to establish a connection with multiple client devices that may be operable in various wireless network standards, such as illustratively the IEEE 802.1 1ax (Wi-Fi 6) and/or 802.11be (Wi-Fi 7), or other similar wireless network standards, including successor standards. Further, based on the determination of the RF channel and multiple client requirements the electronic device establishes a connection with the client devices.

Generally described, orthogonal frequency-division multiplexing (OFDM corresponds to a type of digital transmission used in digital modulation for encoding digital data on multiple carrier frequencies. In an OFDM-based system, subcarrier signals within a single communication channel are orthogonal relative to adjacent signals to prevent interference. Each subcarrier signal can be characterized as a subchannel such that individual subchannels are comprised of predefined bandwidths for data transmissions that can vary depending on the specifications of a wireless network standard. Illustratively, individual OFDM channels can be made up of one or more subchannels that can be allocated for the transmission of data by identified devices. While the technology of OFDM channels is well known to those with experience in the field of the related art, the OFDM channels are merely an example of the type of channels available for establishing a connection with the electronic device and client device(s).

In another aspect, the electronic device assigns subchannel to the RF channels once a connection is established with a client device(s). The electronic device may be able to determine that the subchannels assigned are less than the bandwidth associated with the client device(s) bandwidth. Individual subchannels may further be referred to as a Multi-Resource Unit (MRU) tone. Accordingly, references in various examples and illustrations to subchannel, MRU, or tone may be considered to be interchangeable without limitation to meaning or applicability.

In another aspect, the electronic device is configured to monitor the subchannels assigned to the client device(s) for determining signal quality metrics (SQM) of the assigned subchannel(s), such as the energy of air interference of the subchannel. Based a predetermined requirements the electronic device has established a first threshold for the monitored energy of air interference (or other metrics) of the subchannel. The electronic device is configured to apply preamble puncturing to an adjacent subchannel based on a first determination that the energy of air interference is less than the first threshold.

In another aspect, the electronic device is configured to monitor the subchannels assigned to the client device(s) for determining the signal quality metrics (e.g., interference energy) of the subchannel. The electronic device applies preamble puncturing to the subchannel based on the determined signal quality metric satisfying a first threshold, and further determines to dynamically adjust the bandwidth of the preamble punctured subchannels based on a second determination that a second signal quality metrics (e.g., various combinations or sub-combinations of SNR, BER, etc.) satisfying a second threshold.

In another aspect, the electronic device once determined that the signal quality metric is less than a first threshold, applies the preamble puncturing of the adjacent subchannel and further determines if the puncturing has altered the signal quality in any manner. For example, the electronic device may begin checking the subchannel for additional or alternative signal quality (e.g., SNR, distortion, bit error rate (BER), etc.). The electronic device is configured to determine, for example, the SNR and BER of the subchannel, after applying preamble puncturing is greater than a predetermined second threshold. If the SNR and BER are greater than the second threshold the electronic device dynamically adjusts the subchannel bandwidth to a desired subchannel size.

The subchannel may be increased in size or decreased in size depending on the desired outcome. Further, the desired outcome may be dependent on an incumbent device allocated a specific space within a subchannel that a client device is required to utilize.

In another aspect, the electronic device determines that the SNR and BER are less than the predetermined second threshold and the electronic device decides to use the full bandwidth of the channels.

In another aspect, the electronic device continuously monitors the subchannels and applies preamble puncturing and dynamic bandwidth allocation of the adjacent subchannels based on the determination of the threshold's requirements with respect to the first and second threshold.

As previously described, an AP may allocate a set of subchannels in accordance with OFDM-based communications. Illustratively, different devices may be allocated adjacent subchannels (e.g., individual MRU tones) of a frequency band utilized by a WLAN. In some scenarios, however, individual devices may require or request more bandwidth that is available from an assigned subchannel (e.g., requesting device). To allow for increased bandwidth, it may be possible for a device to utilize at least a portion of an adjacent subchannel for adjacent channels that are not allocated or unused. Illustratively, such a determination can be based on checking whether the interference energy associated with the adjacent subchannel exceeds a threshold. Additionally, it may be possible for a device to utilize at least a portion of an adjacent subchannel that was previously assigned to another device but may not be in active communications. Specifically, in accordance with the illustrative example, in OFDM-based communications, an access point can cause the allocation of a portion of the bandwidth from an adjacent subchannel, generally referred to as preamble puncturing. The adjacent subchannel is typically allocated to a different device, which is generally referred to as an incumbent device or legacy user.

To implement preamble puncturing, an access point may be configured to transmit a punctured portion of the preamble related to the current subchannel associated with a first device. The reason for applying a punctured portion is to optimally maximize the use of adjacent subchannels when an incumbent device is occupying a portion of the bandwidth. The increase in WLAN devices makes it increasingly difficult to find sufficiently unused spectral space.

Further, preamble puncturing may be utilized to perform puncturing of fixed-length bandwidth around an incumbent device to prevent overlapping (e.g., interference) between increased bandwidth to the requesting device and the incumbent device. The requesting device that has established a connection with the access point may be utilizing a wider bandwidth than what can be allocated for the requesting device, the access point is configured to apply preamble puncturing of predetermined fixed bandwidths to allow more efficient functionality of the occupied channel. The utilization of fixed predetermined bandwidths is the loss of potential bandwidth that is not occupied by the incumbent device or the punctured bandwidth the channel is not fully utilized.

In accordance with some implementations, such as one illustrative IEEE Wi-Fi standard version (Wi-Fi 6), an AP assigns one resource unit (RU) to each requesting device and is applied to a single-user (SU) transmission. In other implementations, such as in another illustrative IEEE Wi-Fi standard (Wi-Fi 7), an AP assigns multiple resource units (MRU) for an SU transmission allowing the utilization of different resource unit tones per single user. The MRUs are subchannels with prespecified bandwidths that are utilized for preamble puncturing. Wi-Fi 7 has been optimized for MRU utilization, making the utilization of the bandwidth more efficient. However, existing implementations use of preamble puncturing, and require the utilization of a fixed amount of bandwidth from the adjacent channels. The bandwidth allocated from the adjacent channels is limited in size. The allocated bandwidth requirement might be more than what the allocation can provide, not providing sufficient bandwidth to meet the requirements of a client device. The bandwidth allocation from the adjacent channel, on the other hand, might allocate more than a client device requested sacrificing channel efficiency.

Figure 1:
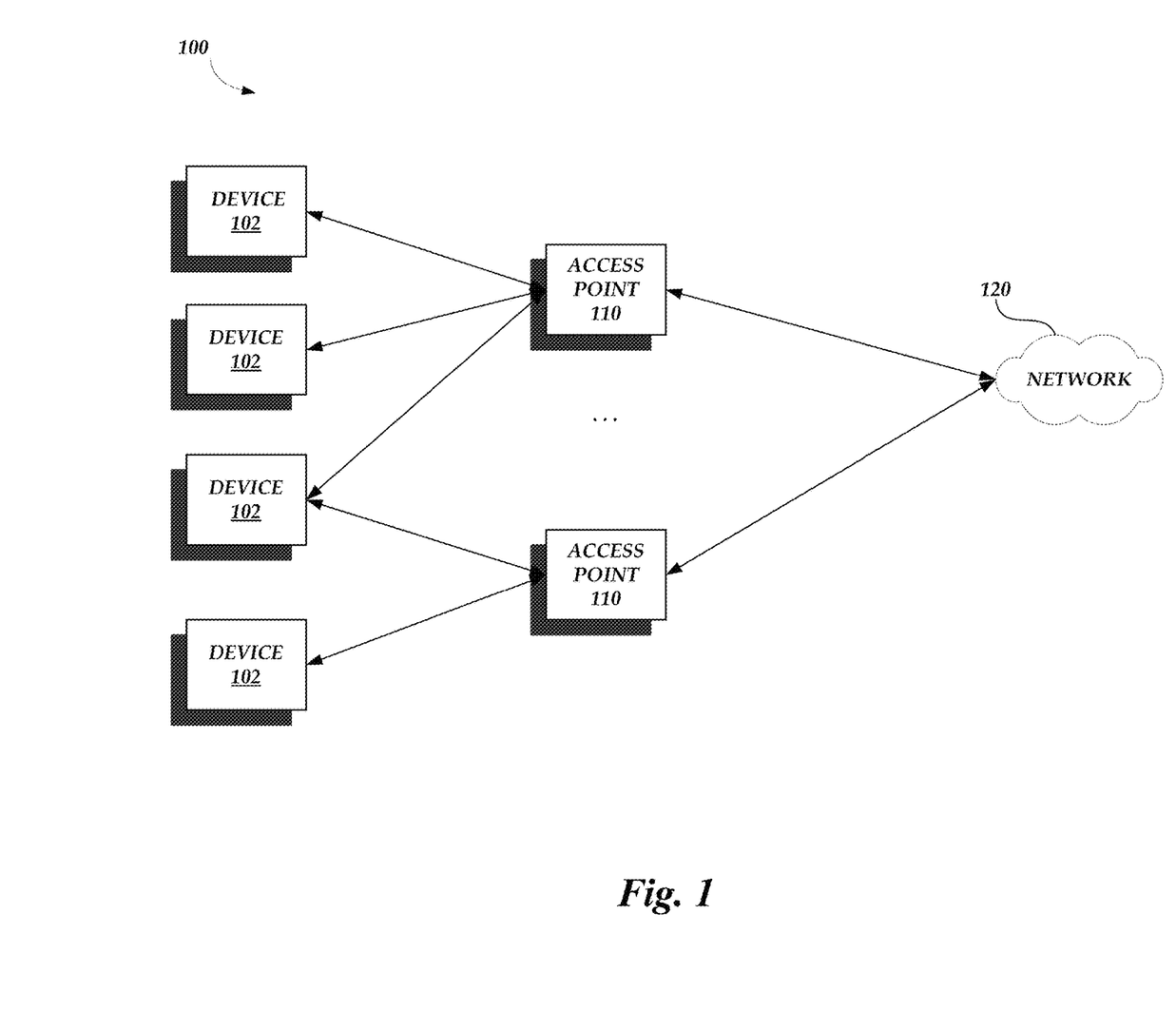
FIG. 1 is an example system diagram that uses dynamic preamble puncturing.

FIG. 1 is a system diagram of an example embodiment of the system 100 for implementing a WLAN in accordance with various aspects of the present application. System 100 includes a network 120, at least one AP 110, and at least one device 102. Device 102 can sometimes be referred to as a client device or local device. Examples of a device 102 include, but are not limited to: a cellular phone, a smartphone, a laptop computer, a desktop computer, a personal digital assistant (PDA), a personal communication system (PCS) device, a personal information manager (PIM), a personal navigation device (PND), a global positioning system, a multimedia device, a video device, an audio device, a device for the Internet-of-Things (IoT), or any other suitable wireless-enabled apparatus configured to communicate with an AP 110. The local device 102 may also be referred to a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An illustrative architecture of a local device 102 will be described with regard to FIG. 2A.

The AP 110 generally corresponds to fixed terminals or network nodes that provide connectivity and access to the network 120 within a defined coverage area or region. In some applications, however, the AP 110 may be a mobile or non-fixed terminal. AP 110 may also be referred to as a base station, a base transceiver station, a radio base station, a radio transceiver, a transceiver function, or any other suitable terminology. The various concepts described throughout this disclosure are intended to apply to all suitable wireless apparatus regardless of their specific nomenclature.

The connection between access point 110 and each individual device 102 may be a wireless connection using radiofrequency-based communications in accordance with one or more standardized frequency bands and protocols. The connection between the individual AP 110 and network 120 may be a wired or wireless connection and is often referred to as a backhaul network or backhaul functionality.

Illustratively, the individual regions or coverage area of a WLAN may be based on the range of the radiofrequency-based communications. Such range can be influenced or configured based on power settings or other configurations of the transceivers utilized by the individual devices 102 and APs 110. Such range (or reception ability) may be further influenced or limited by physical features that can influence the radio frequency signals. Accordingly, reference to an area associated with a WLAN or an AP does not necessarily correspond to an explicit definition of a geography boundary but is referred to logically as the approximate coverage area in which radio frequency signals may be received. In some embodiments, multiple APs 110 may be configured to avoid substantial overlapping coverage areas. In other embodiments, multiple APs 110 may be configured such that there are overlapping coverage areas within a physical area and the local devices 102 are presented with multiple distinct WLANs. In other embodiments, multiple APs 110 may be configured so that a single, extended WLAN is presented to the local devices 102, with some possible overlap in a coverage area. Accordingly, aspects of the present application are not limited to any particular implementation of WLAN or coverage area of AP 110.

Figure 2A:
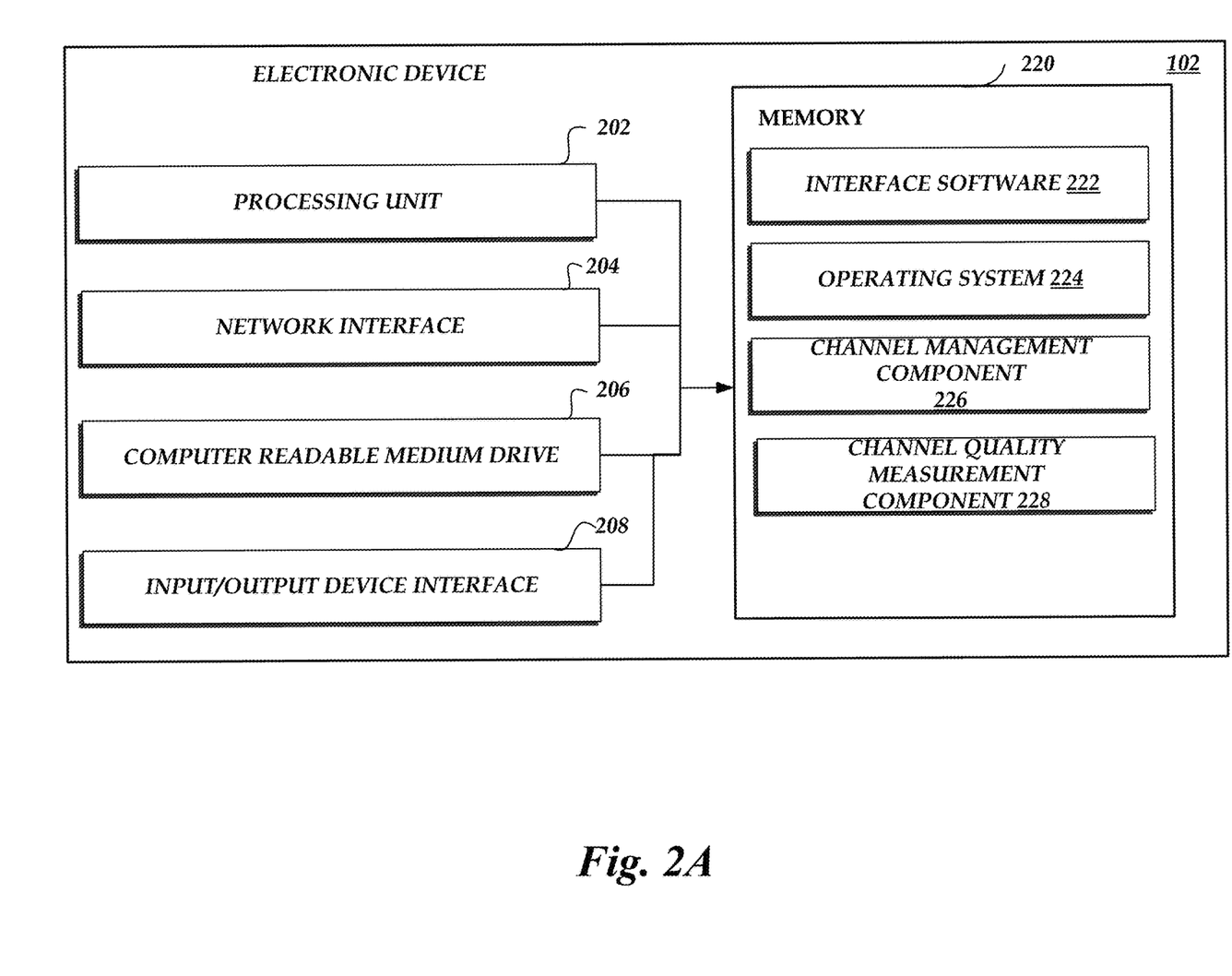
FIG. 2A depicts a block diagram of an example architecture of the electronic device utilized for receiving a preamble punctured channel.

FIG. 2A depicts a block diagram of an example architecture of the electronic device 102 utilized for establishing communications with an AP 110 and receiving preamble punctured channel communications in accordance with various aspects of the present application. The general architecture of the electronic device is depicted in FIG. 2A includes an arrangement of hardware and software components that may be used to implement aspects of device 102 of FIG. 1. As illustrated the electronic device 102 includes an input/output interface 208, a network interface 204, a processing unit 202, computer-readable medium device 206, and a memory 220. The input/output device interface 208 may include a transceiver utilized for establishing a connection with a client device, the connection may be an RF channel communication or any form of wireless communication. The memory 220 includes interface software 222, an operating system 224, a channel management component 226, and a channel quality measurement component 228.

The input/output interface 208, provides the processing unit 202 information regarding the channel quality measurement obtained by the channel quality measurement component 228. Further, the channel quality measurement can be directed to an access point 110 of FIG. 1 and provide information with respect to the first and second thresholds.

The network interface 204 can provide connectivity to the electronic device 102 to an access point 110 of FIG. 1. The processing unit 202 can thus receive information and instructions from other computing systems or services via a network. The processing unit 202 can also communicate to and from memory 220.

Memory 220 can correspond non-transitory computer-readable medium that includes computer program instructions that the processing unit 202 executes in order to implement one or more examples of the electronic device. The memory 220 generally includes RAM, ROM, or other persistent or non-transitory memory. The memory 220 can store an operating system 224 that provides computer program instructions for use by the processing unit 202. The memory 220 can further include computer program instructions and other information for implementing aspects of the electronic device system. For example, the memory 220 includes Interface software 222 for communicating with the access point 110 of FIG. 1.

Channel management component 226 provides channel assignment for the electronic device, the channel assignment can be configured automatically or by user input. Furthermore, the channel management component 226 can be configured to trigger a re-assignment of the channel when determined to be necessary. The channel management component 226 can be further configured to interact with the channel quality measurement component 228, wherein the channel quality measurement component 228 is utilized for determining the quality of the channel (e.g., SNR, BER, etc.) the electronic device is currently connected to. The determination of the channel quality may be communicated to the channel management component 226 and provide a re-assignment of the channel. The determination of the channel quality can further be communicated to the channel management component 226 and provide the processing unit 202 with instructions to transmit information to the access point.

Figure 2B:
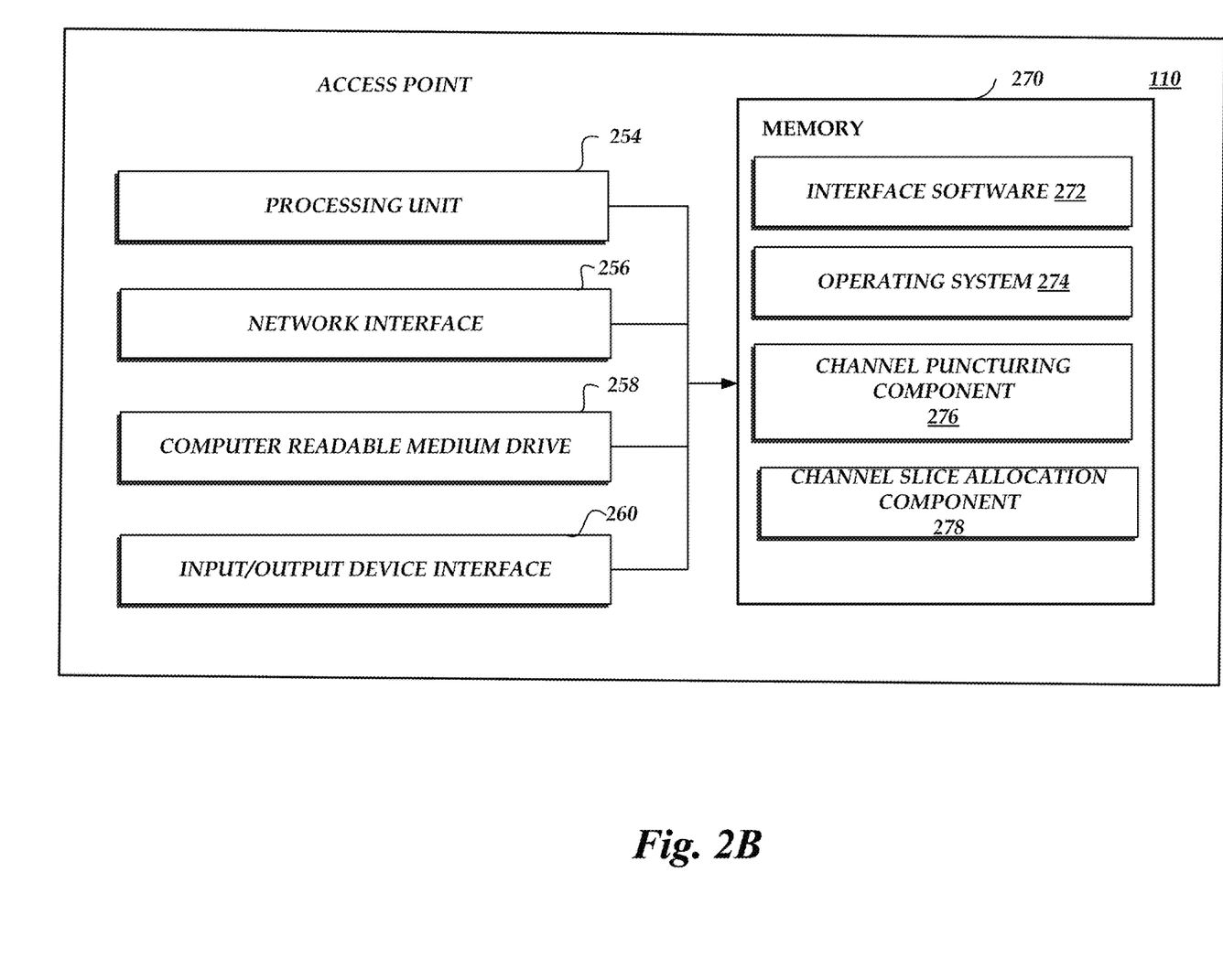
FIG. 2B illustrates a block diagram of an example architecture of the access point utilized for the execution of preamble puncturing of networking channels.

FIG. 2B illustrates a block diagram of an example architecture of the access point utilized for the execution of preamble puncturing of networking channels. The general architecture of the access point is depicted in FIG. 2B includes an arrangement of hardware and software components that may be used to implement aspects of the device 102 of FIG. 1. As illustrated the access point 110 includes an input/output interface 260, a network interface 256, a processing unit 202, computer-readable medium device 258, and a memory 270. The input/output device interface 208 may include a transceiver utilized for establishing a connection with a client device, the connection may be an RF channel communication or any form of wireless communication. The memory 270 includes interface software 272, an operating system 274, channel puncturing component 276, and a channel slice allocation component 278.

The input/output interface 260, provides the processing unit 254 information regarding the channel quality measurement obtained by the channel quality measurement component of the electronic device 102 of FIG. 2A. Further, the channel slice allocation component 278 determines whether the channel quality measurement is greater than or less than the predetermined threshold and informs the processing unit 254 of channel slice allocation based on the channel quality measurement.

The network interface 256 can provide connectivity to the electronic device 102 of FIG. 1. The processing unit 254 can thus receive information and instructions from other computing systems or services via a network. The processing unit 254 can also communicate to and from memory 270.

Memory 270 can correspond non-transitory computer-readable medium that includes computer program instructions that the processing unit 254 executes in order to implement one or more examples of the access point. The memory 270 generally includes RAM, ROM, or other persistent or non-transitory memory. The memory 270 can store an operating system 274 that provides computer program instructions for use by the processing unit 254. The memory 270 can further include computer program instructions and other information for implementing aspects of the access point. For example, the memory 270 includes interface software 272 for communicating with the electronic device 102 of FIG. 1.

Channel puncturing component 276 provides the processing unit 254 with instructions to apply a determined puncturing criteria based on the signal quality of the established connection with the electronic device 102 of FIG. 1. The puncturing criteria may be determined by the processing unit 254 receiving data from the input/output device interface 260, as the electronic device 102 of FIG. 1 may be configured to transmit signal quality data to the access point 110.

Figure 3A:
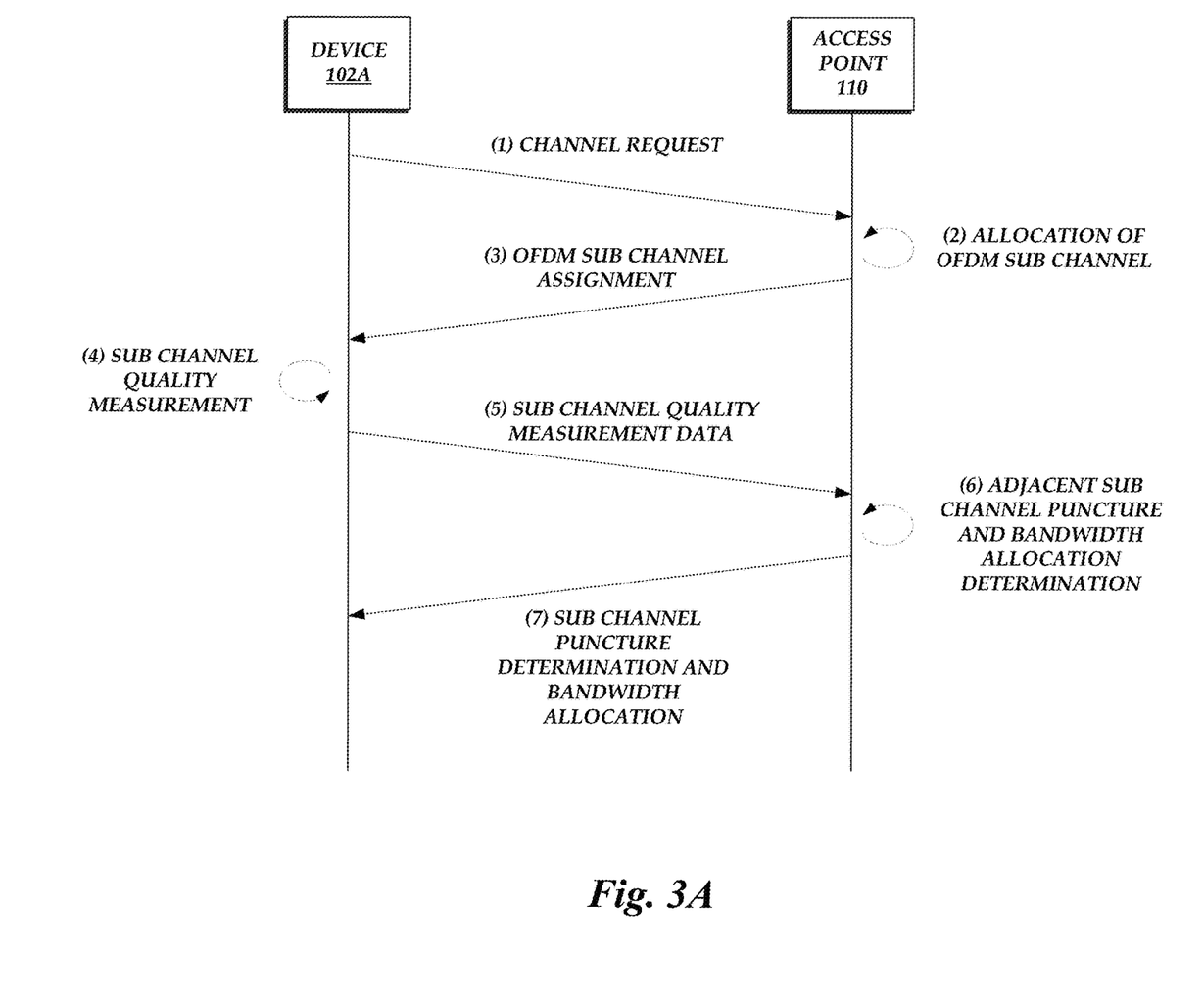
FIG. 3A is a diagram of illustrative interactions to perform subchannel puncturing and bandwidth allocation determination.

FIG. 3A is a diagram illustrating interactions between a first device 102A and an AP 110 to implement subchannel puncturing and bandwidth allocation determination in accordance with the embodiments of the present application. For purposes of illustration, device 102A represents an illustrative device 102 (FIGS. 1 and 2A) that may be allocated additional bandwidth by an implementation of an AP 110. The diagram illustrates the routine between device 102A and access point 110 wherein device 102A requests to establish a connection with the network by way of a channel request (1). The access point 110 retrieves the request to connect from device 102A and begins searching for a channel to establish a connection with device 102A that meets the specified requirements that define operable bands required for device 102A connection. The access point 110 may be configured to search for adjacent subchannels and determine if the adjacent subchannels are occupied by a second device or an incumbent device. As will be described below, the access point 110 determines the occupancy of the subchannel by an assessment of the signal quality metrics of the subchannel, and based on the signal quality metrics satisfying a first specified threshold allocates a subchannel with defined bandwidths corresponding to the OFDM subchannel. The access point 110 allocates the OFDM subchannel (2) based on the device 102A requirements and establishes a connection with the device 102A via subchannel assignment (3).

After establishing the communication channel with the access point 110, the device 102A is configured to measure the quality of the subchannel that has an established connection with the access point 110. Illustratively, the device 102A measures the subchannel quality (4) and incorporates the data into a packet that is transmitted to and can later be decoded by access point 110 (5). The subchannel quality measurement may be based on the signal quality metrics of the subchannel, wherein the signal quality metrics is determined by the occupancy of the subchannel. The device 102A may be configured to continuously transmit data packets that include subchannel quality data.

Figure 4A:
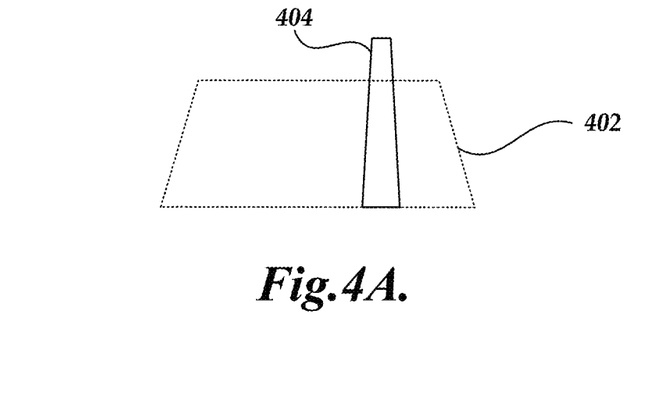
FIG. 4A is an example of an incumbent device located in the desired bandwidth.

Access point 110 obtains and decodes the packet transmitted by device 102A and compares the signal quality metrics of the channel to a prespecified threshold that has been determined to identify a signal strength. In one aspect, the access point 110 may determine, based on the quality of the channel determined to be less than the prespecified threshold, to allocate the full bandwidth of the channel for device 102A utilization. This is indicative of a determination that an interference of an incumbent device 404 of FIG. 4A is less than a specified threshold. Further, the access point 110 may determine to allocate the full bandwidth of the channel based on failing to detect an incumbent device 404 of FIG. 4A Further, the access point 110 may determine, based on the signal quality metrics of the channel determined to be greater than the prespecified threshold, to apply preamble puncturing. For example, the threshold may be set to −62 dBm. However, such a threshold is illustrative in nature and should not be construed as limited. For example, any number of additional thresholds may be applied in accordance with illustrative implementations. Additionally, the thresholds can be further dynamically modified or configured based on the specifics of the individual wireless network implemented by the AP 110 and device 102A or specific wireless network standards.

Based on the subchannel signal quality metrics, the access point 110 will determine whether to apply preamble puncturing of an adjacent subchannel (6) the determination of the signal quality metrics of the subchannel may act as an indicator for an incumbent device actively occupying a portion of the subchannel. The access point 110 may determine a second signal quality metrics and may be an indication to the access point 110 to allocate bandwidth to provision from the adjacent subchannel (7) and dynamically adjust the adjacent subchannel to overcome the incumbent device. An example of the second signal quality metric may be determined to be a SER, BER, etc., and provides the access point 110 with information to dynamically adjust the subchannel before or after the detected incumbent device. For example, a subchannel with 160 MHz bandwidth with an incumbent occupying 20 MHz bandwidth can allocate a subchannel bandwidth spectrally located before the incumbent device to have a bandwidth of 110 MHz and the subchannel spectrally located after the incumbent device to have a bandwidth of 10 MHz, based on spectral location. In other examples, the dynamic nature of the allocation can include various increments above and below 10 MHz. Still further dynamic range can include minimum allocations or maximum allocations. The example provided is not a limiting example and is only provided as an explanation of dynamic bandwidth allocation. The subchannels can be configured to any bandwidth that is determined to be required and/or optimal for use.

Figure 3B:
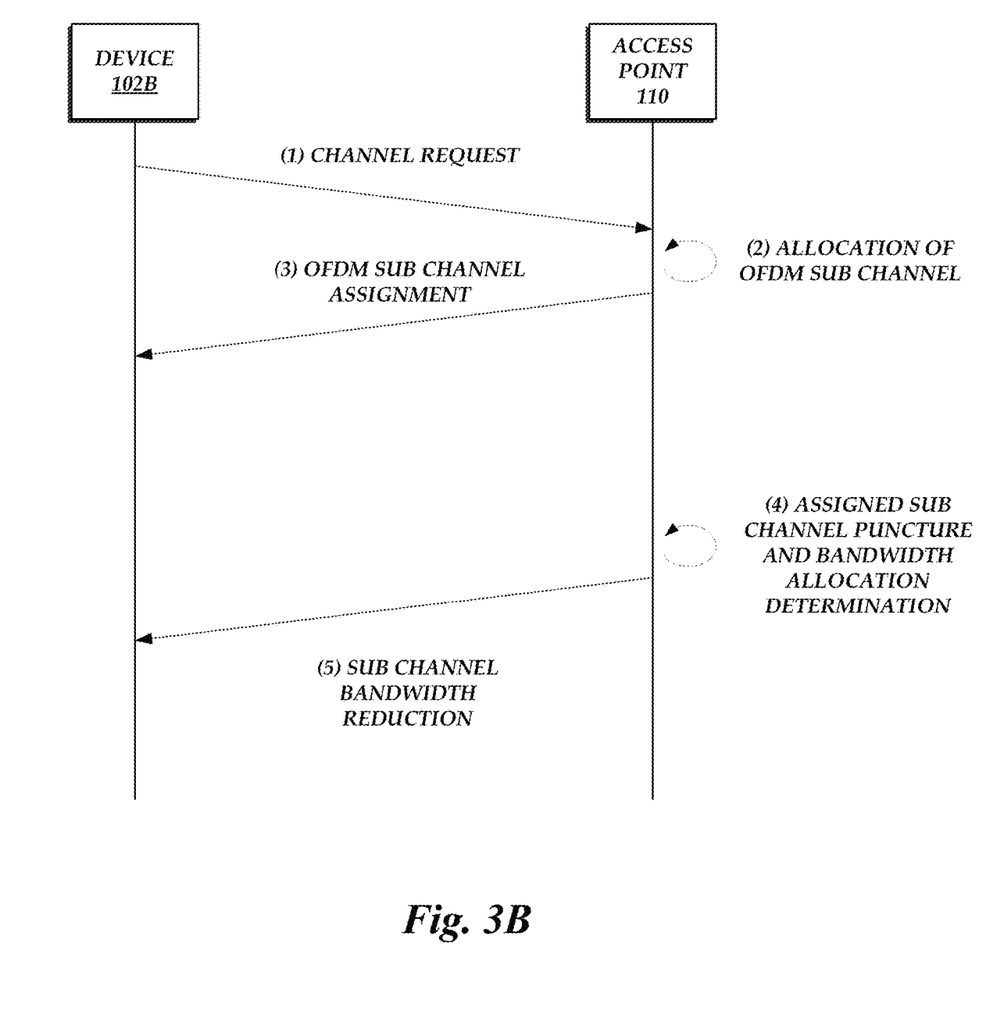
FIG. 3B is another diagram of illustrative interactions to perform subchannel puncturing and bandwidth allocation determination.

FIG. 3B is a diagram illustrating an example of a routine to perform subchannel puncturing and bandwidth allocation determination. For purposes of illustration, device 102B represents an illustrative device 102 (FIGS. 1 and 2A) that may be losing or diminishing bandwidth by an implementation of an AP 110 in comparison to a different device 102A (FIG. 3A). The diagram illustrates the routine between device 102B and access point 110 wherein device 102B requests to establish a connection with the network by way of a channel request (1). The access point 110 retrieves the request to connect from device 102B and allocates a channel with defined bandwidths corresponding to the OFDM subchannel. The access point allocates the OFDM subchannel (2) based on the device 102B requirements and establishes a connection with the device 102B via subchannel assignment (3) and is configured to utilize the full bandwidth.

The access point 110 determines that a first device is configured to utilize the allocated subchannel as described with respect to 102A of FIG. 3A. The access point 110 applies preamble puncturing to the subchannel and bandwidth allocation determination (4) to the subchannel and slices the subchannel bandwidth performing subchannel bandwidth reduction (5) to allocate multiple user functions. With reference to the previous example, it was assumed that a subchannel with 160 MHz bandwidth with an incumbent device occupying 20 MHz bandwidth can allocate a subchannel bandwidth before the incumbent device has a bandwidth of 110 MHz. Accordingly, the subchannel corresponding to the incumbent device has a bandwidth of 10 MHz, based on spectral location.

FIG. 4A is an example of an incumbent device 404 located in the desired bandwidth 402. The desired bandwidth represents the full bandwidth of a subchannel. An incumbent device 404 (e.g., legacy user) may be occupying a specified frequency range for a local area. However, the access point 110 of FIG. 1 may determine the signal quality metric of the subchannel does not satisfy a specified threshold, the access point determines to utilize the desired bandwidth 402 of the subchannel. The desired bandwidth 402 is a representation of a subchannel that is part of at least one subchannel that is part of the total channel. The subchannel, for example, can include a bandwidth totaling 160 MHz. The incumbent device 404 is located in at least a portion of the subchannel bandwidth preventing the access point from using the total channel.

Figure 4B:
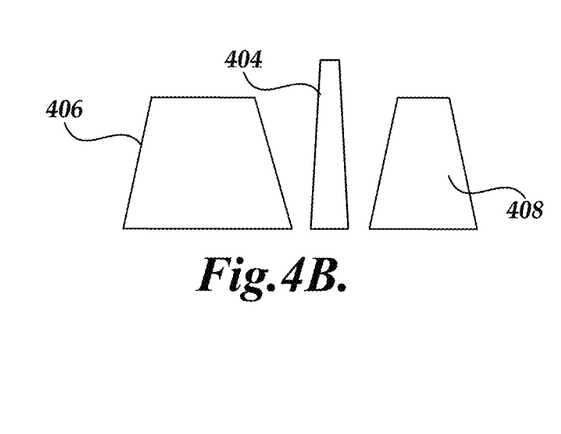
FIG. 4B is an example of preamble puncturing the adjacent subchannel.

FIG. 4B is an example of an incumbent device 404 and preamble punctured subchannels with fixed length bandwidths 406 and 408 with a fixed length bandwidth. For example, the incumbent device may be occupying a 20 MHz bandwidth of the desired channel. The currently existing solution for overcoming an incumbent device is to apply preamble puncturing, the subchannel bandwidth, if 160 MHz with a 20 MHz incumbent device 404 the channel may be punctured with a 120 MHz subchannel and an adjacent 20 MHz subchannel. The fixed length bandwidth provides an inefficient solution to overcome occupied subchannels, the fixed length bandwidth are limited to the specified bandwidths assigned.

Figure 4C:
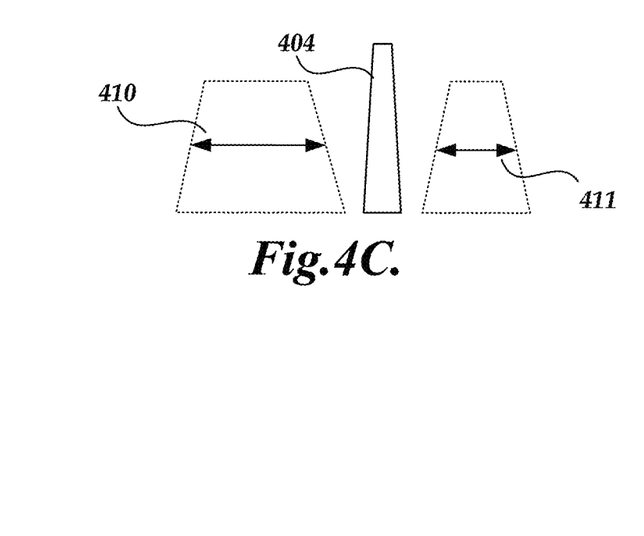
FIG. 4C is an example is dynamic bandwidth allocation of adjacent subchannels.

FIG. 4C is an example of the preamble puncturing with dynamic bandwidth allocation. The channel as mentioned above may be occupied by an incumbent device 404, an access point may apply dynamically allocate bandwidth provisioned from the adjacent subchannel as a result of determining a second signal quality metric satisfying a second threshold post preamble puncturing of the subchannel. For example, the access point may determine the incumbent device is occupying 20 MHz bandwidth of a desired 160 MHz bandwidth subchannel. The incumbent device 404 is occupying a specific portion of a subchannel bandwidth as illustrated. The access point may adjust the subchannel 410 to 20 MHz and adjust the subchannel 411 to 120 MHz, the access point may adjust the subchannel 410 to 120 MHz and adjust the subchannel 411 to 20 MHz based on the determination of the second signal quality metrics of the satisfy a second threshold. Furthermore, the determination to adjust subchannel 410 or 411 is based on a determination of a first threshold (signal quality metrics) satisfying a threshold. The access point may apply adjustments to the bandwidth by reducing or increasing the bandwidth based on requirements determined by the access point. The dynamically allocated bandwidths optimize the channel for greater efficiency and maximize the usability of the full channel.

Figure 5:
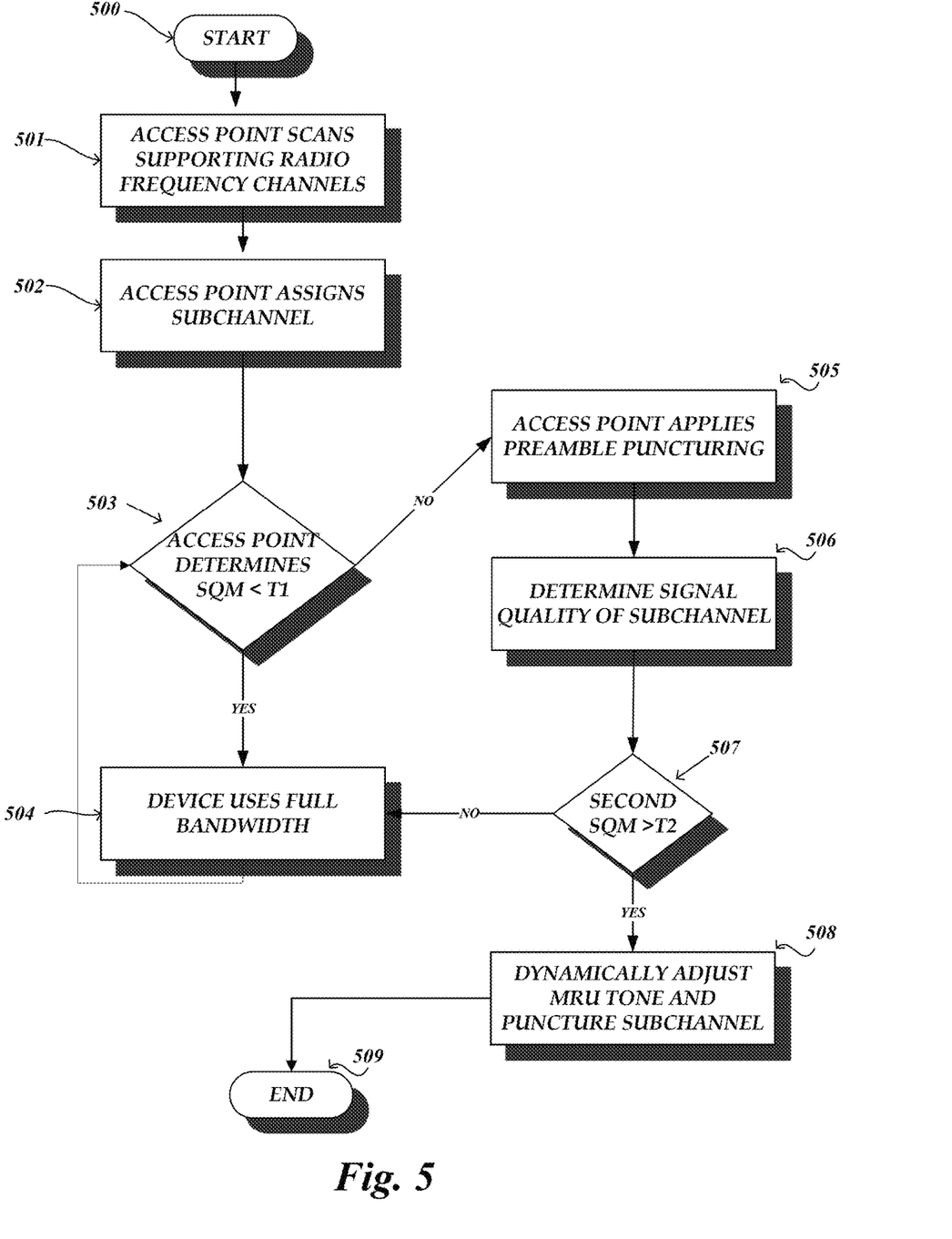
FIG. 5 is a flow diagram for detecting and assigning a supporting radio frequency (RF) channel and applying preamble puncturing, dynamically adjusting tone based on a first and second threshold requirement.

FIG. 5 is a flow diagram for detecting and assigning a supporting RF channel and applying preamble puncturing, dynamically adjusting an RU tone based on a first and second threshold requirement. At block 501, the access point scans supporting radio frequency channels as an electronic device or client device is attempting to access the network in a local area where the access point is located. The access point determines an optimal RF channel the electronic device is supported to use based on detecting an additional user occupying a specified bandwidth section. At block 502, the access point assigns a subchannel to an electronic device. The assignment is based on the access point determining the channel required by an electronic device and based on a factory-specified requirement to establish a connection and determined occupied bandwidths.

At block 503, the access point 110 conducts a test to determine whether signal quality information is indicative of whether preamble puncturing is available. Specifically, in some examples, the access point 110 determines the energy of air interference is less than the first threshold by monitoring the assigned subchannel. The access point may be configured to determine the signal quality of a subchannel, or an electronic device may be configured to determine the signal quality of a subchannel and transmit the related information to the access point. The first threshold might be determined to be set at −62 dBm and may be dynamically modified based on sensitivity requirements. Furthermore, the first threshold may be dynamically modified based on a user interaction with the access point 110 based on the user determining false triggering of the threshold requirement.

In an embodiment where the access point 110 determines the signal quality metrics are greater than the first threshold. At block 504, the access point optimizes the full bandwidth of the channel to be utilized by the electronic device as illustrated in FIG. 4A the desired bandwidth 402. The first threshold may be determined to be specified noise energy that may be configured by a user or may be automatically configured based on a preset. The first threshold may be determined to be an interference energy that may be configured by a user or may automatically be configured based on a preset. An example of a threshold amount could be −62 dBm, wherein the interference energy, if determined to be less than the threshold amount is optimized to use the desired bandwidth 402 of FIG. 4A. Furthermore, a determination to optimize the utilization of a desired bandwidth 402 of FIG. 4A by determining whether an incumbent device is not occupying the specified section of the subchannel.

At block 505, the access point 110 applies preamble puncturing to the adjacent subchannel based on the determination that the signal quality metrics are less than the first threshold of the access point. The first threshold may be determined to be specified noise energy that may be configured by a user or may be automatically configured based on a preset. The first threshold may be determined to be an interference energy that may be configured by a user or may automatically be configured based on a preset. An example of a threshold amount could be −62 dBm, wherein the interference energy, if determined to be greater than the threshold amount is optimized to use the fixed length bandwidth 406 and 408 of FIG. 4B. The fixed length bandwidths can be configured with respect to the bandwidths of the subchannel as represented by the MRU tones. At block 506, the access point is further configured to determine the signal quality of the subchannel subsequent to applying preamble puncturing. At decision block 507, the access point determines if the second signal quality metrics are greater than the second threshold.

Referring again block 504, wherein at the decision of block 507, the access point 110 has made a determination that the signal quality metrics are less than the second threshold, the access point is configured to utilize full bandwidth of the subchannel. The determination of the signal quality metrics may indicate that access point has detected interference energy not significant enough to require preamble puncturing of the subchannel. A non-limiting example of the signal quality metrics that is indicative of the signal quality metric being less than the second threshold is a higher SNR and a lower BER.

Referring again to decision block 507, at block 508 the access point dynamically adjusts MRU tones and puncture subchannel based on the determination that the signal quality metrics are greater than a second threshold. The second threshold might be determined to be a modulation and coding scheme (MCS) index safety margin with a minimum SNR value of 3 dBm. Further, the second threshold might be determined to be a SNR and BER and/or a packet error ratio (PER) that is dynamically adjusted based on sensitivity requirements. Further, the second threshold may be a combination of any of the previously described second thresholds. Furthermore, the second threshold may be dynamically modified based on a user interaction with the access point 110 based on the user determining false triggering of the threshold requirement. The dynamic adjustment of MRU tones dynamically adjusts the bandwidth of subchannels as described in FIG. 4C. Subchannel 410 and 411 of FIG. 4C illustrates the adjustable bandwidth configured by slicing more or less puncturing space of the subchannel based on specified requirements, thus adjusting the MRU tone for greater or lesser bandwidth. The dynamic adjustment of the MRU tone is utilized for maximizing utilization of the full bandwidth while a second user or an incumbent device occupies a determined bandwidth of the channel the electronic device is connected to.

Figure 6:
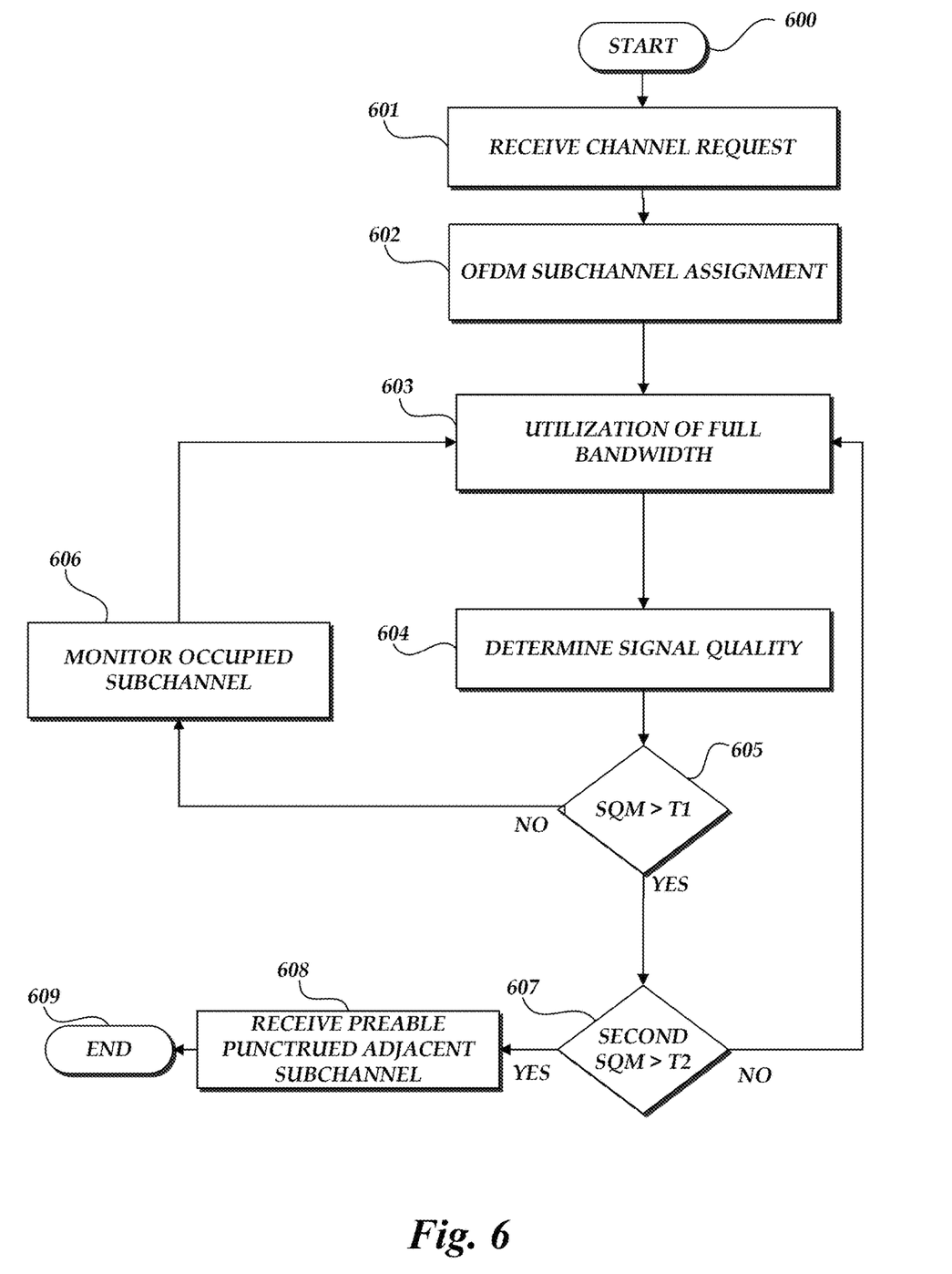
FIG. 6 is a flow diagram of a client device receiving a preamble punctured subchannel.

FIG. 6 is a flow diagram of a client device receiving a dynamically adjusted preamble punctured subchannel, wherein the access point is configured to request from a client device a request for the supporting RF channel. At block 601, the client device receives the channel request from an access point, wherein the access point is attempting to make a determination of an appropriate channel allocation to the client device. The client device may be configured to provide the access point with the information of the respected request. At block 602, the client device receives, from the access point, an OFDM subchannel assignment for establishing a connection with the access point. At block 603, the client device is initially configured to utilize the full bandwidth of the channel that was allocated for the utilization of the client device. At block 604, the client device determines if the signal quality of the allocated channel based a specified criteria. The client device may be further configured to provide the access point with data regarding the signal quality of the subchannel.

At block 605, the client device determines the signal quality metric of the subchannel by determining if the energy of air interference is less than the first threshold. The determination of the SNR may be transmitted to the access point for further determination of subchannel allocation. At block 606, the client device monitors the occupied subchannel and is further configured to utilize the full bandwidth of the channel allocated by the access point based on a determination that the energy of air interference is less than the first threshold. At block 607, the client device determines if the SNR and BER, a second signal quality metric, are greater than a second threshold based on the energy of air interference is determined to be greater than the first threshold. At block 608, the client device receives a preamble punctured adjacent subchannel based on the determination that the SNR and BER are greater than a second threshold. The client device may determine that the SNR and BER are less than the second threshold and are further configured to inform the access point of the determination of the signal quality. Based on determining the SNR and BER is less than the second threshold the access allocates full bandwidth for the client device utilization.

Conditional language such as, among others, "can," "could," "might," or "may," unless specifically stated otherwise, are otherwise understood within the context as used in general to convey that certain examples include, while other examples do not include, certain features, elements, and/or blocks. Thus, such conditional language is not generally intended to imply that features, elements, and/or blocks are in any way required for any examples or that any example necessarily includes logic for deciding, with or without user input or prompting, whether these features, elements, and/or blocks are included or are to be performed in any particular example.

Disjunctive languages such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include computer-executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. An electronic device comprising:
   a transceiver; and
   a processor to:
   scan for radio frequency (RF) channels, wherein the RF channels are defined bandwidths that correspond to orthogonal frequency-division multiplexing (OFDM)-based channels;
   establish a connection with a client device based on a client device requirement, and further assign a subchannel with a bandwidth to the RF channels, wherein the bandwidth of the assigned subchannel is less than bandwidth associated with a client device bandwidth;
   monitor subchannel signal quality metric (SQM) and apply preamble puncturing to an adjacent subchannel based on a first determination that the SQM is less than a first threshold; and
   subsequent to applying the preamble puncturing, allocate bandwidth to provision from the adjacent subchannel based on a subchannel second SQM exceeding a second threshold.

2. The electronic device of claim 1, wherein the processor is to apply preamble puncturing based on an incumbent device occupying a specific portion of a subchannel bandwidth.

3. The electronic device of claim 1, wherein the SQM is an interference energy and the subchannel second SQM is a signal to noise ratio (SNR) or a bit error rate (BER).

4. The electronic device of claim 1, wherein the processor is to determine that the SQM is greater than a first threshold and allocates a full bandwidth of the subchannel to the client device.

5. The electronic device of claim 3, wherein the processor, subsequent to applying the preamble puncturing, is to dynamically allocate a first subchannel and the adjacent subchannel based on a combination of the SNR and BER exceeding a second threshold.

6. The electronic device of claim 1, wherein before applying preamble puncturing, the bandwidth of the subchannel is assigned a full bandwidth, wherein the electronic device reduces a subchannel bandwidth based on the preamble puncturing.

7. The electronic device of claim 1, wherein the processor is to receive SNR data from the client device.

8. A non-transitory computer-readable medium comprising computer-readable instructions which, when executed by a processor of an electronic device, cause the electronic device to:
   identify an RF channel operable with a client device, wherein a RF channel bandwidth exceeds an assigned subchannel;
   identify an incumbent device in a portion of a first adjacent subchannel to the assigned subchannel;
   determine to apply preamble puncturing to the first adjacent subchannel based on subchannel puncturing criteria; and
   subsequent to applying the preamble puncturing, dynamically allocate bandwidth from an adjacent subchannel, wherein the dynamically allocated bandwidth is based on signal quality of the adjacent subchannel being greater than a threshold.

9. The non-transitory computer-readable medium of claim 8, wherein the instructions, when executed by the processor, further cause the electronic device to dynamically allocate bandwidth to the first adjacent subchannel based on signal quality of the adjacent subchannel being greater than a threshold.

10. The non-transitory computer-readable medium of claim 8, wherein before applying preamble puncturing, the bandwidth of the assigned subchannel is assigned a full bandwidth, and wherein the instructions, when executed by the processor, further cause the electronic device to determine to apply preamble puncturing of available subchannel bandwidth based on an occupied bandwidth of the incumbent device.

11. The non-transitory computer-readable medium of claim 8, wherein identifying an RF channel operable with a client device further comprises determining that second client device is operating on a required subchannel.

12. The non-transitory computer-readable medium of claim 8, wherein before applying preamble puncturing the bandwidth of the assigned subchannel is assigned a full bandwidth, and wherein the instructions, when executed by the processor, further cause the electronic device to determine to continue to allocate the full bandwidth based on a determination that the subchannel puncturing criteria is not satisfied.

13. The non-transitory computer-readable medium of claim 8, wherein before applying preamble puncturing, the bandwidth of the assigned subchannel is assigned a full bandwidth, and wherein the instructions, when executed by the processor, further cause the electronic device to determine to continue to allocate the full bandwidth based on a determination that an incumbent device is not present in the assigned subchannel.

14. The non-transitory computer-readable medium of claim 8, wherein the instructions when executed further cause the client device to monitor and collect a SNR data and inform the electronic device of the SNR data collected.

15. An electronic device comprising:
    a transceiver; and
    a processor to:
    establish a connection with a host device, wherein the host device assigns a subchannel to a radio frequency (RF) channel corresponding to orthogonal frequency-division multiplexing (OFDM)-based channels;

transmit first measured first signal quality data of a received data to the host device;

transmit second measured second signal quality data of the received data to the host device; and receive, from the host device, preamble punctured adjacent subchannel allocation information based on the first measured first signal quality data being greater than a first threshold and allocated bandwidth provisioned from the adjacent subchannel based on the second measured second signal quality data.

16. The electronic device of claim 15, wherein the processor is to receive a subchannel with a full bandwidth based on the transmitted first measured first signal quality data being greater than a first threshold.

17. The electronic device of claim 15, wherein receiving the preamble punctured adjacent subchannel based on the subchannel puncturing criteria not meeting a specified threshold.

18. The electronic device of claim 15, wherein the second measured second signal quality data determines subchannel bit error rate (BER), signal error rate (SER), and signal to noise ratio (SNR).

19. The electronic device of claim 15, wherein the first measured first signal quality data determines an incumbent device is occupying a specified bandwidth of the subchannel.

20. The electronic device of claim 15, wherein the electronic device is a first electronic device in a local area and the host device is a first host device in a local area.

* * * * *